US008102618B2

(12) United States Patent
Chan et al.

(10) Patent No.: US 8,102,618 B2
(45) Date of Patent: Jan. 24, 2012

(54) SYSTEM, METHOD AND APPARATUS FOR DISK DRIVE RECIRCULATION FILTER HAVING INLET AND OUTLET DISK RIM SHROUDING

(75) Inventors: Andre S. Chan, Milpitas, CA (US); Ferdinand Hendriks, Morgan Hill, CA (US); Robert Carl Reinhart, San Jose, CA (US); James Francis Sullivan, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 995 days.

(21) Appl. No.: 12/041,759

(22) Filed: Mar. 4, 2008

(65) Prior Publication Data
US 2009/0225470 A1 Sep. 10, 2009

(51) Int. Cl.
*G11B 33/14* (2006.01)
(52) U.S. Cl. .................. 360/97.02; 360/97.03
(58) Field of Classification Search ..... 360/97.02–97.03
See application file for complete search history.

(56) References Cited

U.S. PATENT DOCUMENTS

| 6,208,484 | B1 | 3/2001 | Voights |
| 6,255,750 | B1 | 7/2001 | Mohajerani et al. |
| 6,560,066 | B2 * | 5/2003 | Imai et al. .................. 360/97.02 |
| 6,628,475 | B2 * | 9/2003 | Nakamoto et al. ......... 360/97.02 |
| 6,654,201 | B2 * | 11/2003 | Smith ......................... 360/97.02 |
| 6,903,899 | B2 | 6/2005 | Sakata et al. |
| 6,989,959 | B2 | 1/2006 | Chang et al. |
| 7,002,774 | B2 | 2/2006 | Adams |
| 7,123,439 | B2 | 10/2006 | Chan et al. |
| 7,158,342 | B2 | 1/2007 | Chan et al. |
| 7,203,030 | B2 | 4/2007 | Chan et al. |
| 2002/0105754 | A1 | 8/2002 | Goeke et al. |
| 2003/0107839 | A1 | 6/2003 | Smith |
| 2003/0210492 | A1 * | 11/2003 | Adams et al. .............. 360/97.02 |
| 2006/0066992 | A1 | 3/2006 | Chan et al. |
| 2006/0238915 | A1 | 10/2006 | Hendriks |
| 2007/0153416 | A1 | 7/2007 | Chan et al. |
| 2007/0188914 | A1 * | 8/2007 | Gross ......................... 360/97.02 |

FOREIGN PATENT DOCUMENTS

| JP | 2001023347 A | 1/2001 |
| JP | 2002109858 A | 4/2002 |
| JP | 2002133827 A | 5/2002 |
| JP | 2002208270 A | 7/2002 |

OTHER PUBLICATIONS

Heo, Baekho, et al., Reducing Disk Flutter by Improving Aerodynamic Design of Base Castings, IEEE Transactions on Magnetics, vol. 36, No. 5, Sep. 2000.

(Continued)

*Primary Examiner* — Daniell L Negron
*Assistant Examiner* — Carlos E Garcia

(57) ABSTRACT

A hard disk drive has a recirculation filter that shrouds the rims of disks at the inlet and outlet of the filter. The shroud is aerodynamically shaped to reduce flow-induced disk vibration of the read/write head. A significant improvement in non-repeatable run-out is provided when the inlet and outlet are shrouded along the rims of the disks.

20 Claims, 7 Drawing Sheets

OTHER PUBLICATIONS

Aruga, Keiji, 3.5-inch High-Performance Disk Drives for Enterprise Applications: AL-7 Series, FUJITSU Sci. Tech. J., 37, 2, p. 126-39, Dec. 2001.

Teerhuis, Arjan P., et al., Reduction of Flow-Induced Suspension Vibrations in a Hard Disk Drive by Dual-Stage Suspension Control, IEEE Transactions on Magnetics, vol. 39, No. 5, Sep. 2003.

Kirpekar, Sujit, et al., A Study on the Efficacy of Flow Mitigation Devices in Hard Disk Drives, IEEE Transactions on Magnetics, vol. 42, No. 6, Jun. 2006.

Tadada, Shigenori, et al., Study on Flow-Induced Vibration of Head-Disk Assembly Mechanisms in Actual Hard Disk Drive, Microsystem Technologies, vol. 13, Nos. 8-10, May 2007.

* cited by examiner

SYSTEM, METHOD AND APPARATUS FOR DISK DRIVE RECIRCULATION FILTER HAVING INLET AND OUTLET DISK RIM SHROUDING

BACKGROUND OF THE INVENTION

1. Technical Field

The present invention relates in general to hard disk drives and, in particular, to an improved system, method, and apparatus for a hard disk drive having a recirculation filter with shrouding that shrouds the rims of disks at the inlet and outlet of the filter.

2. Description of the Related Art

Data access and storage systems typically comprise one or more storage devices that store data on magnetic or optical storage media. For example, a magnetic storage device is known as a direct access storage device or a hard disk drive (HDD) and includes one or more disks and a disk controller to manage local operations concerning the disks. The hard disks themselves are usually made of aluminum alloy or a mixture of glass and ceramic, and are covered with a magnetic coating. One to six disks are usually stacked on a common spindle that is turned by a disk drive motor at several thousand revolutions per minute.

A typical HDD also utilizes an actuator assembly. The actuator moves magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The surface of the slider facing the disk is aerodynamically shaped to create an air bearing in order to maintain a uniform distance from the surface of the rotating disk, thereby preventing the head from undesirably contacting the disk.

Typically, a slider is formed with an aerodynamic pattern of protrusions on its air bearing surface that enables the slider to fly at a substantially constant height close to the disk during operation of the disk drive. A slider is associated with each side of each disk and flies just over the disk's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops a torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop and settle directly over the desired track.

Some disk drive designs use an air recirculation filter to reduce contamination inside the disk drive. Since the amount of available space inside a disk drive enclosure is typically very limited, it can be difficult to accommodate such a filter. One difficulty in determining the proper location for a recirculation filter is selecting a space that is suitable for both good clean up efficiency and one that will have a minimum impact on other important criteria, specifically track misregistration (TMR) and aerodynamic power consumption.

In small form factor drives, the lack of space usually results in placing the recirculation filter 11 at the so-called "11 o'clock" location. FIGS. 1-3 depict one type of prior art placement of a filter at the 11 o'clock position with unshrouded inlet 13 and outlet 15. As best shown in FIG. 2, the rim 17 of the disk 19 is completely exposed at both the inlet 13 and at the outlet 15 in front of the air filter 11. As shown in FIG. 3, the filter inlet 13 and outlet 15 are open all the way to the casting floor 21.

Wherever the disk is not shrouded the airflow separates from the disk in a highly turbulent and unsteady manner. The result is undesirable unsteady forces on the disk which contribute to position errors (as indicated by the position error signal (PES)) of the read/write head. With such physical interruptions adjacent to the disks, disk flutter is exacerbated due to an increase in flow turbulence in between and around the filter.

The unsteadiness of the aerodynamic forces has frequency components that are beyond the bandwidth of current servo systems. Such forces cannot be corrected or, worst yet, are even amplified by the servo system. In principle, the high frequency components could be counteracted with systems based on micro-actuators and the like, but such systems can be quite expensive and prone to their own increased aerodynamic excitation. Thus, an improved solution for overcoming the limitations and problems associated with the prior art would be desirable.

SUMMARY OF THE INVENTION

Embodiments of a system, method, and apparatus for a hard disk drive having a recirculation filter with shrouding that shrouds the rims of disks at the inlet and outlet of the filter are disclosed. The aerodynamic shaping utilized by the invention is a highly effective and economical means of reducing flow-induced disk vibration or flutter compared to prior art solutions.

The invention provides a significant improvement in non-repeatable run-out (NRRO) when the inlet and outlet are shrouded along the rims of the disks. An NRRO reduction of about 0.2% TP (track pitch) at the disk outer diameter (OD) is realized in some applications. Such improvements result in a reduction in disk flutter modes, particularly in the sensitive OD region.

The invention advantageously reduces disk flutter and NRRO, and reduces the overall part count for the disk drive to reduce its cost (i.e., no extra part is needed as a filter holder). The invention also allows the filter to be placed at the 11 o'clock position and reduces power consumption by the disk drive. In one embodiment, the rims of the disks are completely shrouded while allowing the recirculation flow to pass through the filter.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention are attained and can be understood in more detail, a more particular description of the invention briefly summarized above may be had by reference to the embodiments thereof that are illustrated in the appended drawings. However, the drawings illustrate only some embodiments of the invention and therefore are not to be considered limiting of its scope as the invention may admit to other equally effective embodiments.

DETAILED DESCRIPTION OF THE INVENTION

Figure 1:
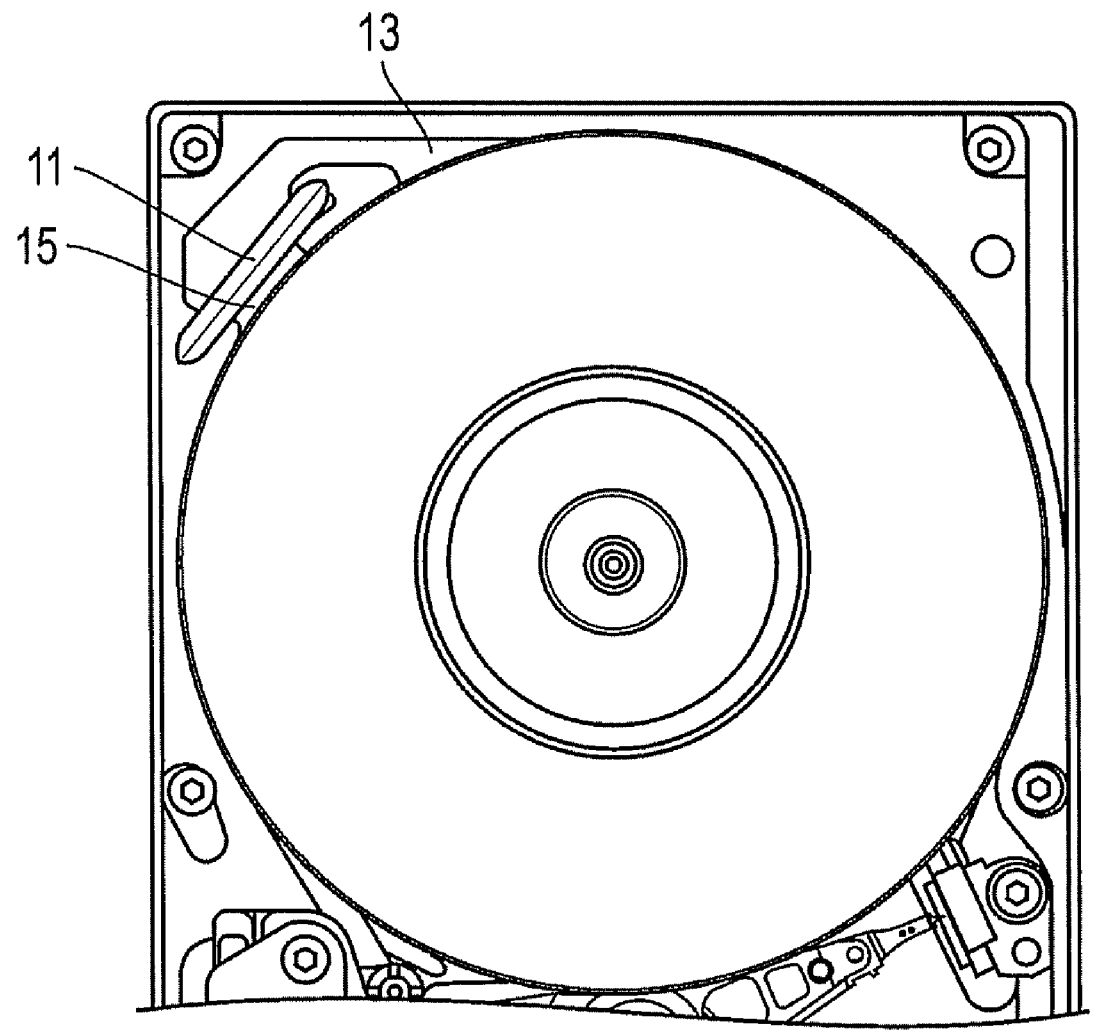
FIG. 1 is a plan view of a conventional disk drive with cover removed.
Figure 2:
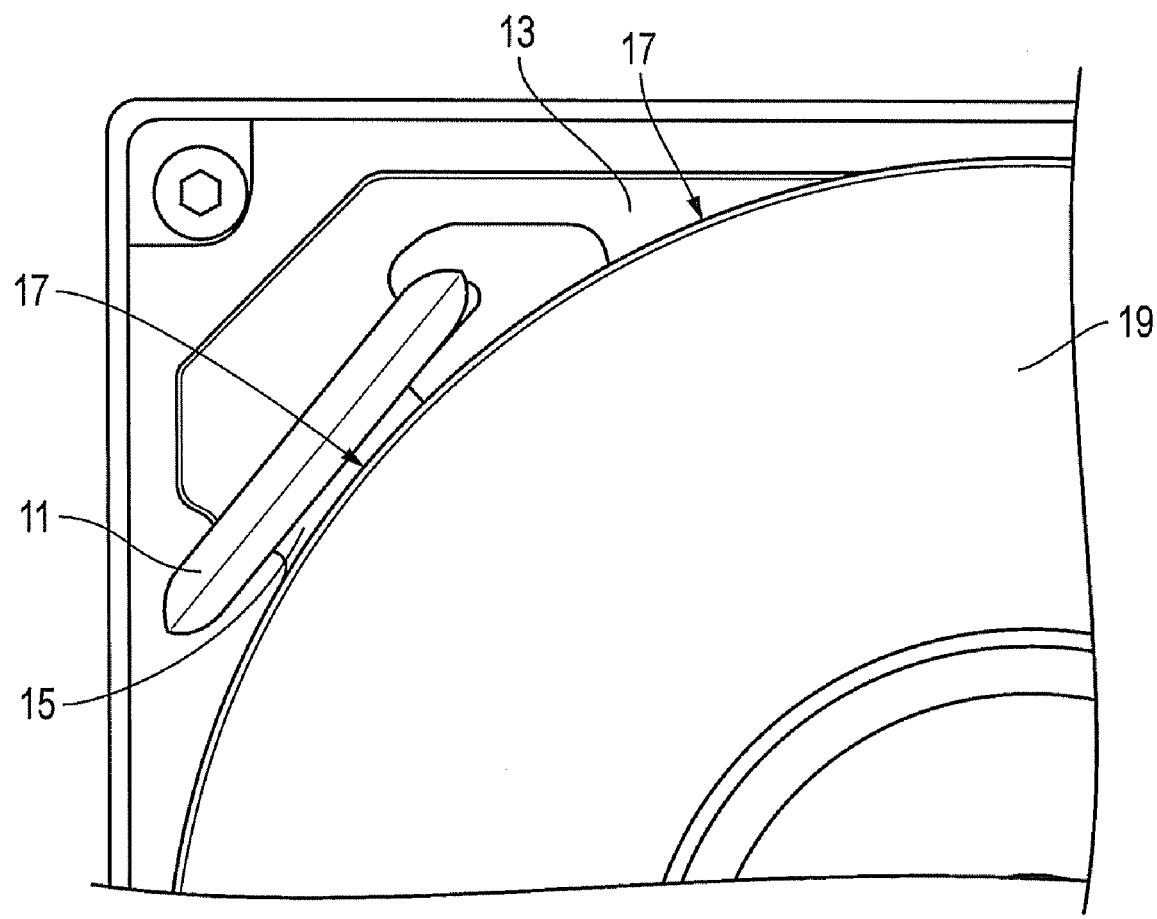
FIG. 2 is an enlarged plan view of a portion of the conventional disk drive of FIG. 1.
Figure 3:
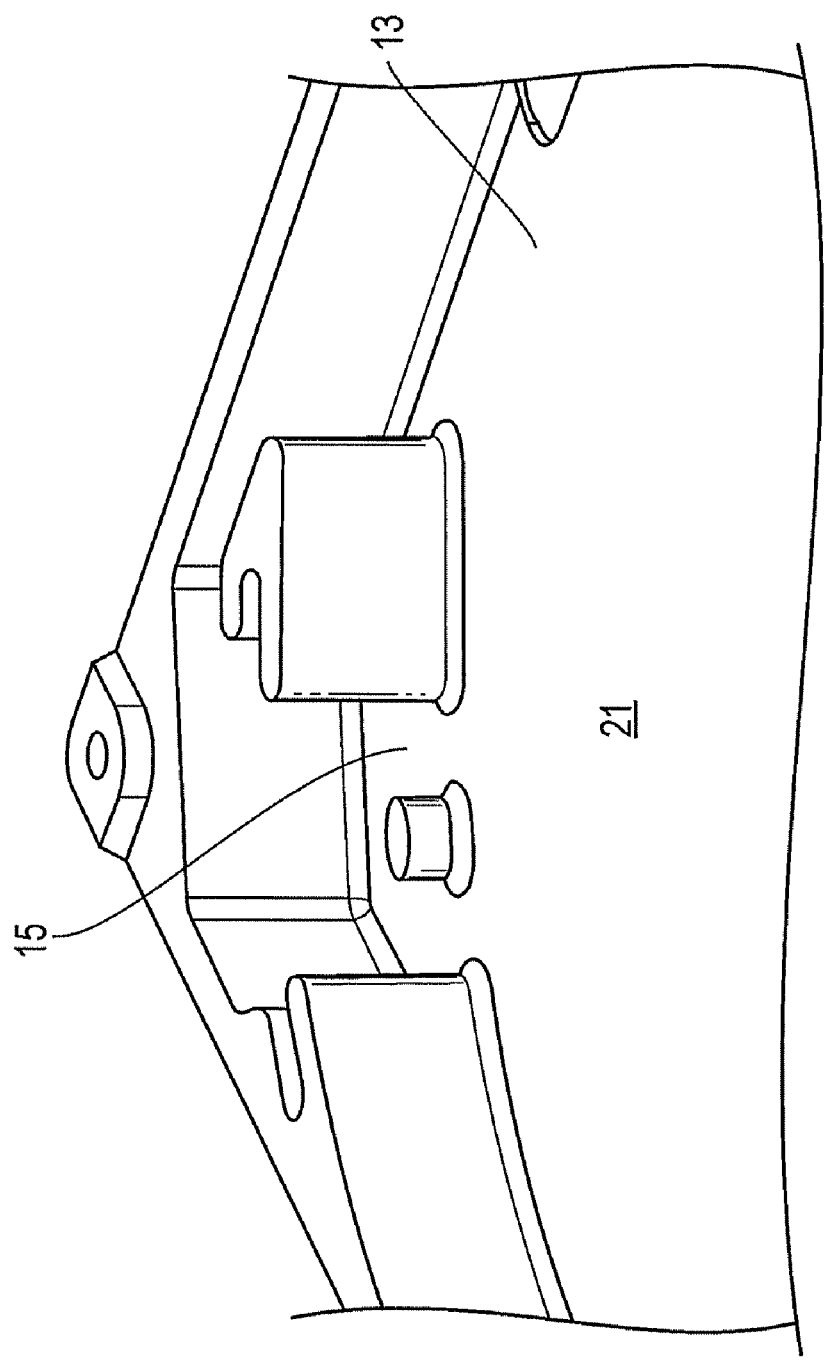
FIG. 3 is an isometric view of the portion of the conventional disk drive of FIG. 1 with the disk and filter removed.
Figure 4:
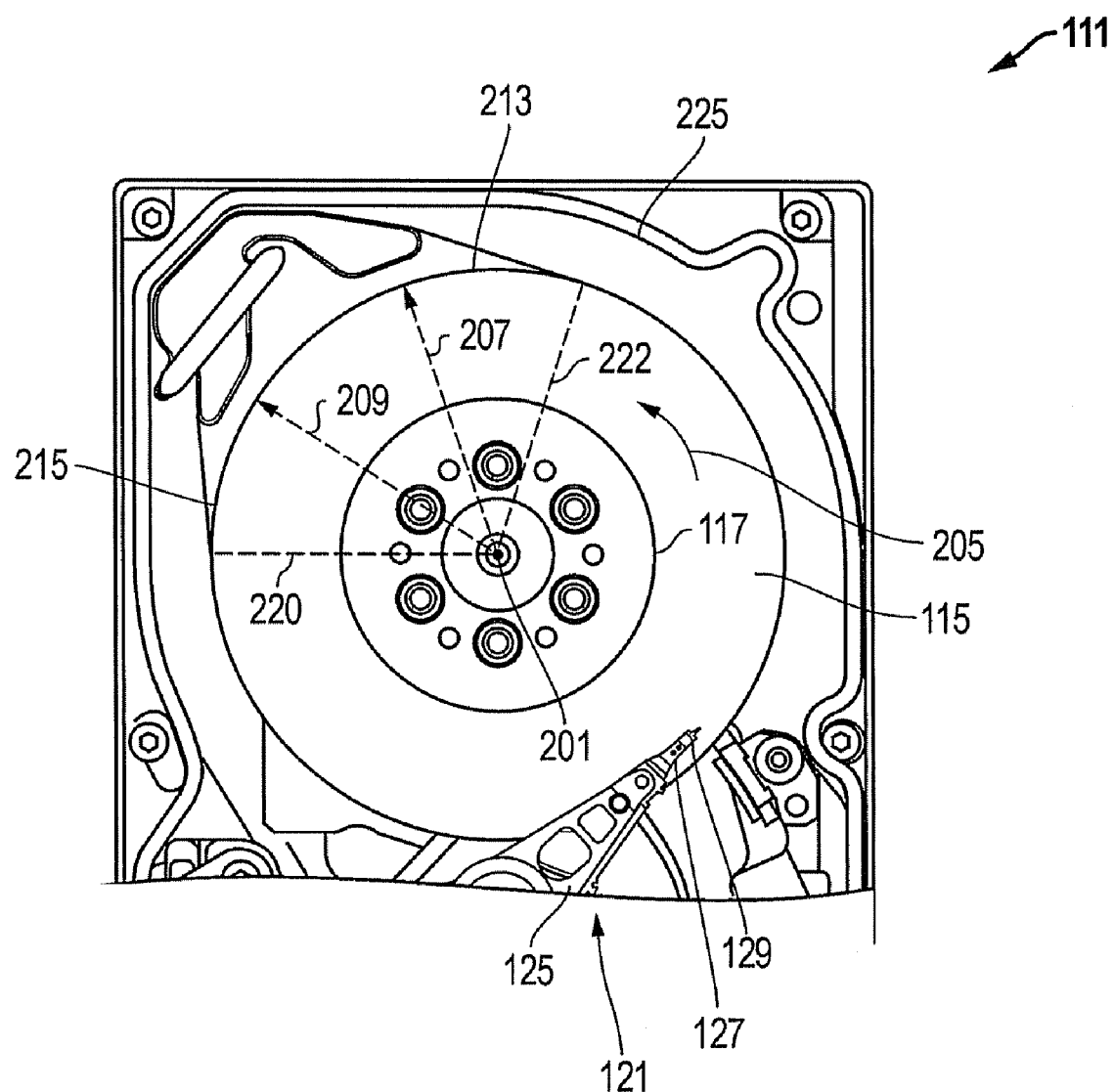
FIG. 4 is a plan view of one embodiment of a disk drive constructed in accordance with the invention and shown with cover removed.
Figure 5:
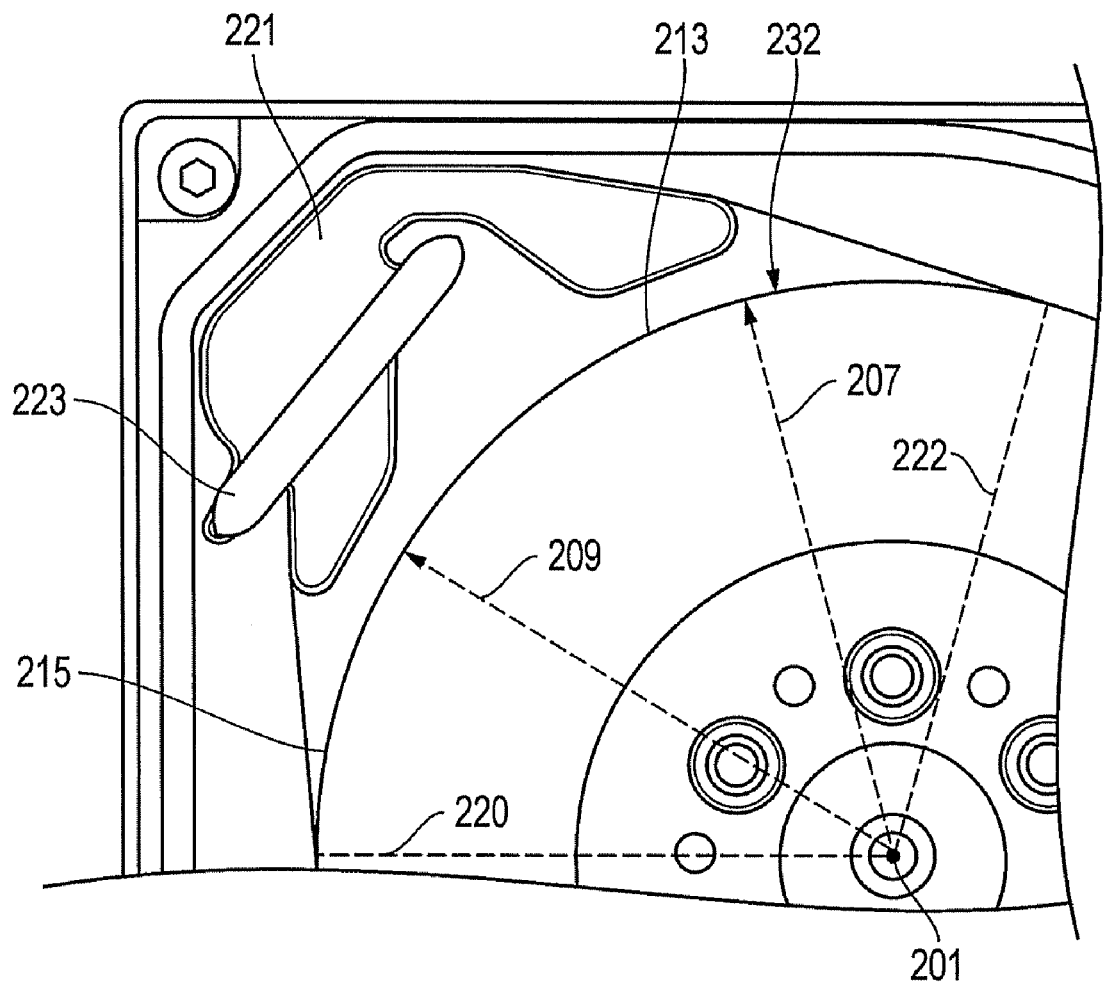
FIG. 5 is an enlarged plan view of a portion of the disk drive of FIG. 4 and is constructed in accordance with the invention.

Referring to FIG. 4, one embodiment of a system, method and apparatus for a hard disk drive having a recirculation filter with shrouding that shrouds the rims of disks at the inlet and outlet of the filter is disclosed. The drive 111 has an outer housing or base 113 containing a disk pack having at least one medium or magnetic disk 115. The disk or disks 115 are rotated (see arrows 205) by a spindle motor assembly having a central drive hub 117. An actuator 121 comprises a plurality of parallel actuator arms 125 (one shown) in the form of a comb that is movably or pivotally mounted to base 113 about a pivot assembly. A controller is also mounted to base 113 for selectively moving the comb of arms 125 relative to disk 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disk 115. The level of integration called the head gimbal assembly consists of the head and the slider 129, which are mounted on suspension 127. The slider 129 is usually bonded to the end of suspension 127.

Suspensions 127 have a spring-like quality, which biases or urges the air bearing surface of the slider 129 against the disk 115 to cause the slider 129 to fly at a precise distance from the disk. A voice coil that is free to move within a conventional voice coil motor magnet assembly is also mounted to arms 125 opposite the head gimbal assemblies. Movement of the actuator 121 by the controller moves the head gimbal assemblies along radial arcs across tracks on the disk 115 until the heads settle on their respective target tracks.

Referring now to FIGS. 4-7, the disk pack and disks 115 (one shown) define an axis 201 of rotation 205 and radial directions 207, 209, relative to the axis 201. The disk pack and disks 115 have a downstream side 213 wherein air flows away from the disks 115, and an upstream side 215 wherein air flows toward the disks 115.

The drive 111 also has a shroud 219 (best shown in FIG. 6) that is formed in the housing 113. In the embodiment shown, shroud 219 is integrally formed with the base casting or housing 113. Shroud 219 directs the air flow generated by rotation of the disks 115 from the downstream side 213 of the disk pack or disks 115, through a filter channel 221, an air filter 223 located in filter channel 221, and then to the upstream side 215 of the disk pack or disk 115. The body of the shroud 219 reduces air flow drag from and to the disks 115 due to disk wake in and through the filter channel 221. The mixing of air inside the disk pack with that from outside the disk pack causes tangential Reynolds stress. The work done by this Reynolds stress must be supplied by the spindle motor. To minimize both excitation and the amount of power required by the spindle, turbulent mixing must be minimized.

In the embodiment shown, the shroud 219 is located between an outer perimeter 217 of the housing 113 and the disk 115. In one embodiment, the shroud 219 is located in what is commonly referred to as the "11 o'clock position" (see upper left portions of FIGS. 4 and 5). This may comprise locating the shroud 219 on the opposite side of disk 215 relative to actuator 121 (see FIG. 4), which is located adjacent to the "5 o'clock position." In one embodiment, the shroud 219 may extend in an arcuate or circumferential span from about the 9 o'clock position (see line 220) to about the 12 o'clock position (see line 222) or beyond.

A seal 225 extends near and around the outer perimeter 217 to seal the cover (not shown) to housing 113. The shroud 219, filter channel 221 and air filter 223 are located completely within the seal 225 to protect them from exposure to external contaminants relative to drive 111.

Figure 6:
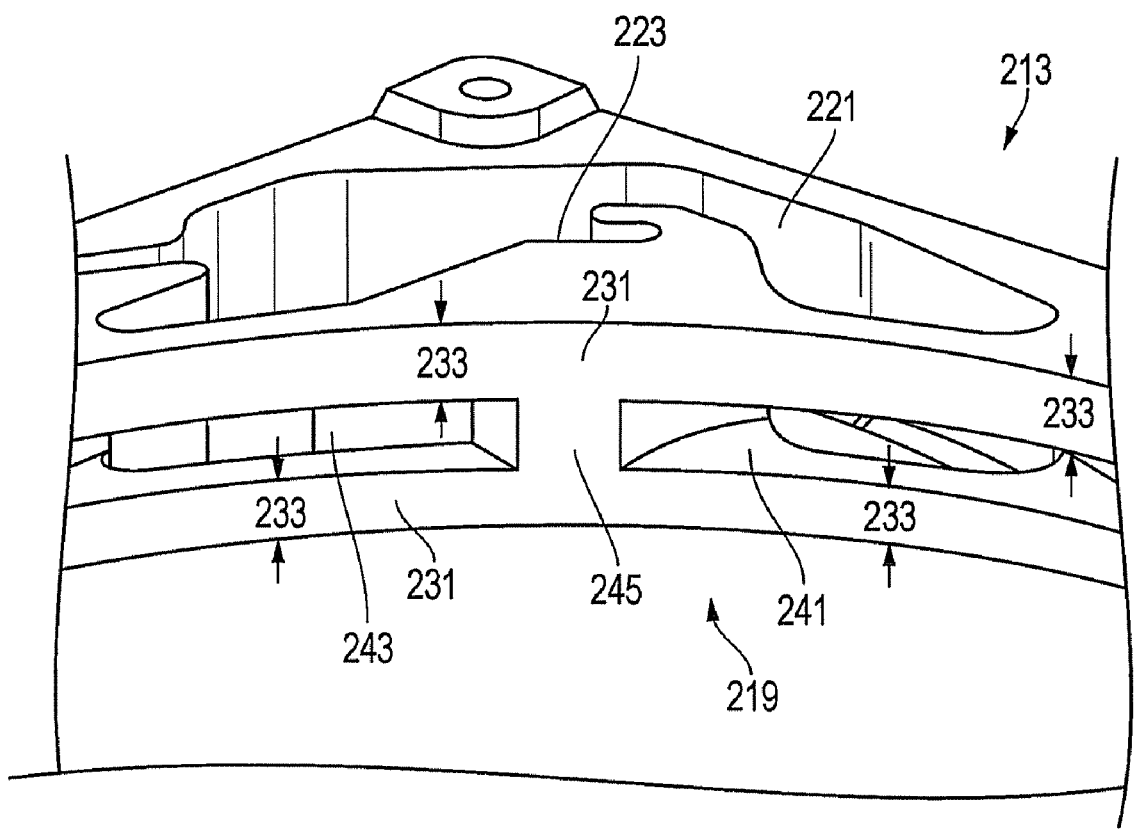
FIG. 6 is an isometric view of the portion of the disk drive of FIG. 5 with the disk and filter removed.
Figure 7:
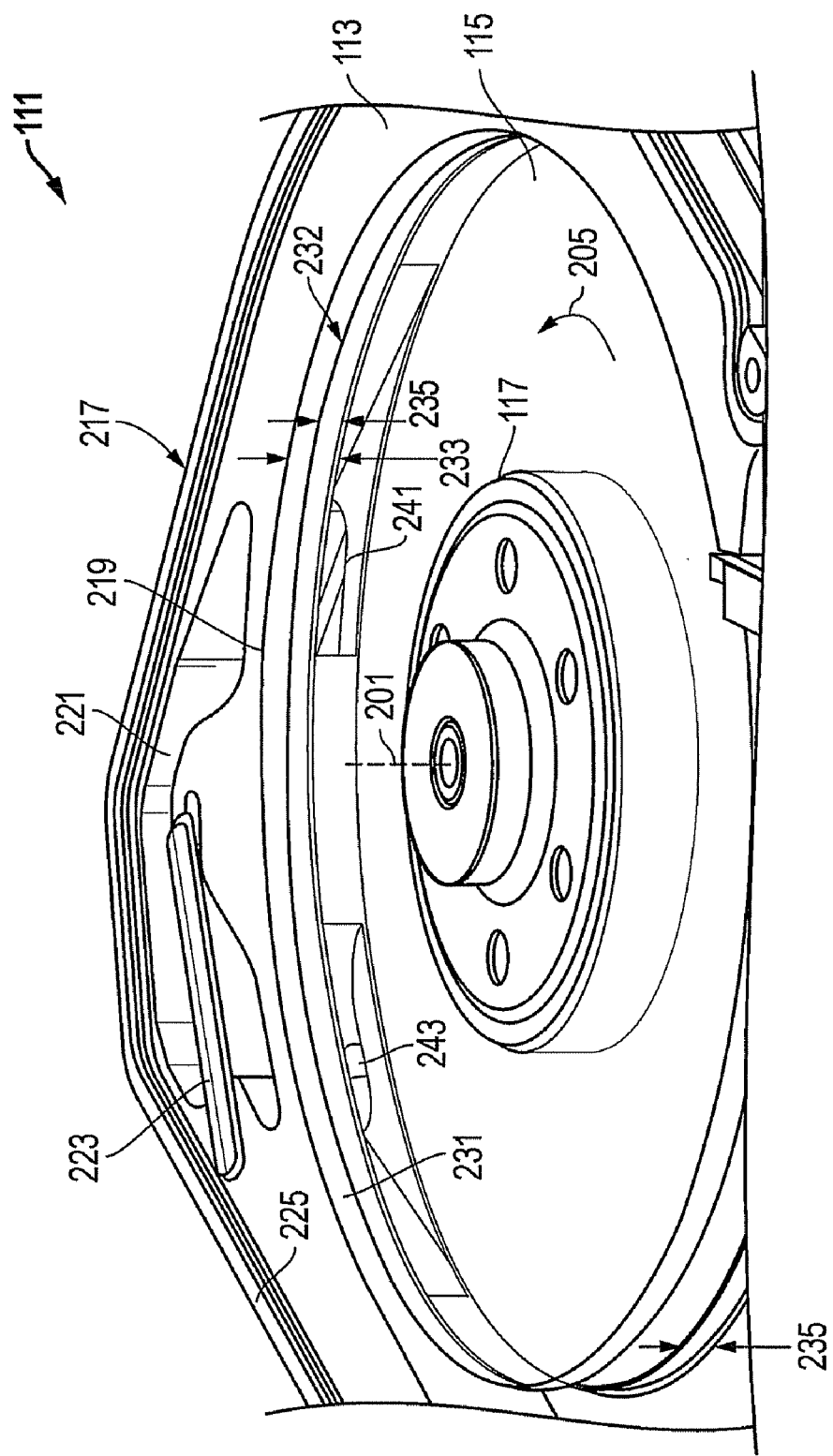
FIG. 7 is an isometric view of the portion of the disk drive of FIG. 6 shown with the top disk transparent.

In the two-disk configuration shown in FIGS. 6 and 7, the shroud 219 is provided with two edge walls 231 that closely follow the external contours (i.e., rims 232 in FIG. 6) of the two disks 115. However, the shroud may be provided with more or fewer edge walls depending on the number of disks contained within a particular drive. The edge walls 231 are arcuate and complimentary in shape to the perimeters or rims 232 of the disks 115. The edge walls 231 are radially spaced apart from the rims 232 by a radial clearance that is typically greater than 0 mm but less than 1 mm. For example, the radial clearance may comprise no more than about 0.2 mm.

Each of the edge walls 231 of the shroud 219 has a generally cylindrical transverse surface extending in the axial direction that flatly faces the rims 232 of the disks 115. The transverse surfaces are located immediately adjacent to respective ones of the disks 115 (see FIGS. 4, 5 and 7) and is substantially perpendicular to the planar orientations of the disks 115. The edge walls 231 have arcuate contours that are complementary in shape with respect to circular outer edges 232 of the disks 115.

Again referring to FIGS. 6 and 7, the edge walls 231 have axial dimensions or thicknesses 233 that are equal to or greater than the axial dimensions or thicknesses 235 of their respective disks 115. In addition, the entire thickness 235 of each disk 115 is axially aligned with or located within the axial direction and dimension 233 of respective ones of the edge walls 231.

Arcuate slotted openings 241, 243 formed between the edge walls 231 provide ingress and egress, respectively, for filter channel 221. Opening 241 is formed on the downstream side 213 of disk 115, while opening 243 is formed on the upstream side 215 (FIG. 5) of disk 115. The openings 241, 243 may be divided by a partition 245 (FIG. 6) as shown, which may be located at the 11 o'clock position. Also in the embodiment shown, the filter 223 (FIGS. 5 and 7) is located only adjacent to the downstream side 215 (FIG. 5) of the disk, rather than the upstream side 213 or both sides.

In one embodiment, the shroud is located between the filter channel and the disk adjacent to both the downstream and upstream sides of the disk. The shroud has arcuate edge walls that are complementary in shape to the outer rim of the disk and closely follow an external contour of the outer rim of the disk. The arcuate edge walls are complimentary in shape to the outer rim of the disk and have generally cylindrical transverse surfaces extending in the axial direction that flatly face the outer rim of the disk. The transverse surfaces are located immediately adjacent to the outer rim of the disk substantially perpendicular to a planar orientation of the disk. The shroud has arcuate slotted openings formed adjacent to the arcuate edge walls to provide ingress and egress, respectively, for the filter channel.

The air filter 223 filters the air flowing through the filter channel 221 and/or housing 113. In one embodiment, the air filter 223 incorporates electrical charges to filter the air flowing through the filter channel 221 and/or housing 113. The efficacy of the filtration material may be enhanced, for example, by incorporation of electric charges (electret).

While the invention has been shown or described in only some of its forms, it should be apparent to those skilled in the art that it is not so limited, but is susceptible to various changes without departing from the scope of the invention.

What is claimed is:
1. A hard disk drive, comprising:
   a housing;
   a disk mounted to the housing and being rotatable relative to the housing, the disk defining an axis of rotation and a radial direction relative to the axis, and the disk having a outer rim, a downstream side wherein air flows away from the disk, and an upstream side wherein air flows toward the disk;
   an actuator mounted to the housing and being movable relative to the disk, the actuator having a head for reading data from and writing data to the disk;
   a filter channel formed in the housing for directing air flow generated by rotation of the disk through an air filter;
   a shroud located between the filter channel and the disk adjacent to both the downstream and upstream sides of the disk, the shroud having arcuate edge walls that are complementary in shape to the outer rim of the disk;
   the arcuate edge walls have transverse surfaces that are cylindrical and extend in the axial direction to flatly face the outer rim of the disk, the transverse surfaces being located immediately adjacent to the outer rim of the disk substantially perpendicular to a planar orientation of the disk;
   each of the arcuate edge walls has an axial dimension that is equal to or greater than an axial dimension of the disk;
   an entire thickness of the disk is axially aligned with or located within the axial dimension of the arcuate edge walls; and
   the shroud has arcuate slotted openings that are axially spaced apart from the outer rim of the disk to provide only one ingress and only one egress, respectively, for the filter channel, each of which faces radially inward toward the axis.

2. A hard disk drive according to claim 1, wherein the shroud is integrally formed with the housing.

3. A hard disk drive according to claim 1, wherein the shroud directs the air flow generated by rotation of the disk from the downstream side, through the filter channel and the air filter, and to the upstream side of the disk.

4. A hard disk drive according to claim 1, wherein the shroud is located between an outer perimeter of the housing and the disk at an 11 o'clock position relative to the axis of rotation, and the shroud is located on an opposite side of the disk relative to the actuator.

5. A hard disk drive according to claim 1, wherein the shroud extends in a circumferential span from about a 9 o'clock position to about a 12 o'clock position relative to the axis of rotation.

6. A hard disk drive according to claim 1, wherein the arcuate edge walls closely follow an external contour of the outer rim of the disk, the arcuate edge walls being complimentary in shape to the outer rim of the disk.

7. A hard disk drive according to claim 6, wherein each of the arcuate edge walls is radially spaced apart from the outer rim by a radial clearance that is greater than 0 mm but less than 1 mm.

8. A hard disk drive according to claim 1, wherein ingress is provided through a downstream one of the arcuate slotted openings that is formed on the downstream side of the disk, and egress if provided through an upstream one of the arcuate slotted openings that is formed on the upstream side of the disk.

9. A hard disk drive according to claim 8, wherein the arcuate slotted openings are divided by a partition that is located at an 11 o'clock position relative to the axis of rotation.

10. A hard disk drive according to claim 1, wherein the air filter is located only adjacent to the upstream side of the disk.

11. A hard disk drive, comprising:
    a housing;
    a disk mounted to the housing and being rotatable relative to the housing, the disk defining an axis of rotation and a radial direction relative to the axis, and the disk having an outer rim, a downstream side wherein air flows away from the disk, and an upstream side wherein air flows toward the disk;
    an actuator mounted to the housing and being movable relative to the disk, the actuator having a head for reading data from and writing data to the disk;
    a filter channel formed in the housing for directing air flow generated by rotation of the disk through an air filter; and
    a shroud located between the filter channel and the disk adjacent to both the downstream and upstream sides of the disk, the shroud having arcuate edge walls that are complementary in shape to the outer rim of the disk, the arcuate edge walls closely follow an external contour of the outer rim of the disk, the arcuate edge walls being complimentary in shape to the outer rim of the disk and having generally cylindrical transverse surfaces extending in the axial direction that flatly face the outer rim of the disk, the transverse surfaces being located immediately adjacent to the outer rim of the disk substantially perpendicular to a planar orientation of the disk, and the shroud has arcuate slotted openings formed adjacent to the arcuate edge walls but axially spaced apart from the outer rim of the disk to provide ingress and egress for the filter channel exclusively in a radial direction relative to the axis.

12. A hard disk drive according to claim 11, wherein the shroud is integrally formed with the housing.

13. A hard disk drive according to claim 11, wherein the shroud directs the air flow generated by rotation of the disk from the downstream side, through the filter channel and the air filter, and to the upstream side of the disk.

14. A hard disk drive according to claim 11, wherein the shroud is located between an outer perimeter of the housing and the disk at an 11 o'clock position relative to the axis of rotation, and the shroud is located on an opposite side of the disk relative to the actuator.

15. A hard disk drive according to claim 11, wherein the shroud extends in an arcuate span from about a 9 o'clock position to about a 12 o'clock position relative to the axis of rotation.

16. A hard disk drive according to claim 11, wherein the arcuate edge walls are radially spaced apart from the outer rim by a radial clearance of no more than about 0.2 mm.

17. A hard disk drive according to claim 11, wherein each of the arcuate edge walls has an axial dimension that is equal to or greater than an axial dimension of the disk, and wherein an entire thickness of the disk is axially aligned with or located within the axial dimension of the edge wall in an axial direction.

18. A hard disk drive according to claim 11, wherein ingress is provided through a downstream one of the arcuate slotted openings that is located on the downstream side of the disk, and egress if provided through an upstream one of the arcuate slotted openings that is located on the upstream side of the disk.

19. A hard disk drive according to claim 11, wherein the arcuate slotted openings are divided by a partition that is located at an 11 o'clock position relative to the axis of rotation.

20. A hard disk drive according to claim 11, wherein the air filter is located only adjacent to the upstream side of the disk.

\* \* \* \* \*